Aug. 17, 1937.　　C. G. RICHARDSON ET AL　　2,090,069
PROPORTIONING CONTROLLER
Filed June 2, 1934　　3 Sheets-Sheet 1

INVENTOR
Charles G. Richardson
Jeff Corydon
By Ferd Bing Atty.

Patented Aug. 17, 1937

2,090,069

UNITED STATES PATENT OFFICE 2,090,069

PROPORTIONING CONTROLLER

Charles G. Richardson and Jeff Corydon, Providence, R. I., assignors to Builders Iron Foundry, Providence, R. I., a corporation of Rhode Island Application June 2, 1934, Serial No. 728,654

10 Claims. (Cl. 137—165)

Our invention relates generally to proportioning apparatus and more particularly to controllers which operate under the governing action of a variable master quantity of liquid flowing in a main conduit to control a dependent quantity of a material such as a reagent in proportion to the flow in the main conduit.

Another object of the invention is to provide apparatus of this character which may, at a reasonable cost, be incorporated in a relatively large master conduit.

Another object is to provide such apparatus constructed and arranged so as to be adaptable to a great variety of operating conditions.

Another object is to provide apparatus of this character wherein a differential pressure producer in the main conduit controls and varies the output or stroke length of a constant rate reciprocating reagent pump so as to maintain a predetermined proportion between the pump output and the flow in the conduit.

Other objects and advantages will become apparent from the following description taken in connection with the accompanying drawings, in which.

While we have shown in the accompanying drawings and will herein describe in detail the preferred embodiment of the invention, together with two alternative embodiments thereof, it is to be understood that this disclosure is given for the purpose of illustrating the invention and is not intended as a limitation of the invention to the constructions disclosed. In the appended claims, we aim to cover all modifications and alternative constructions falling within the scope of the invention.

Figure 1:
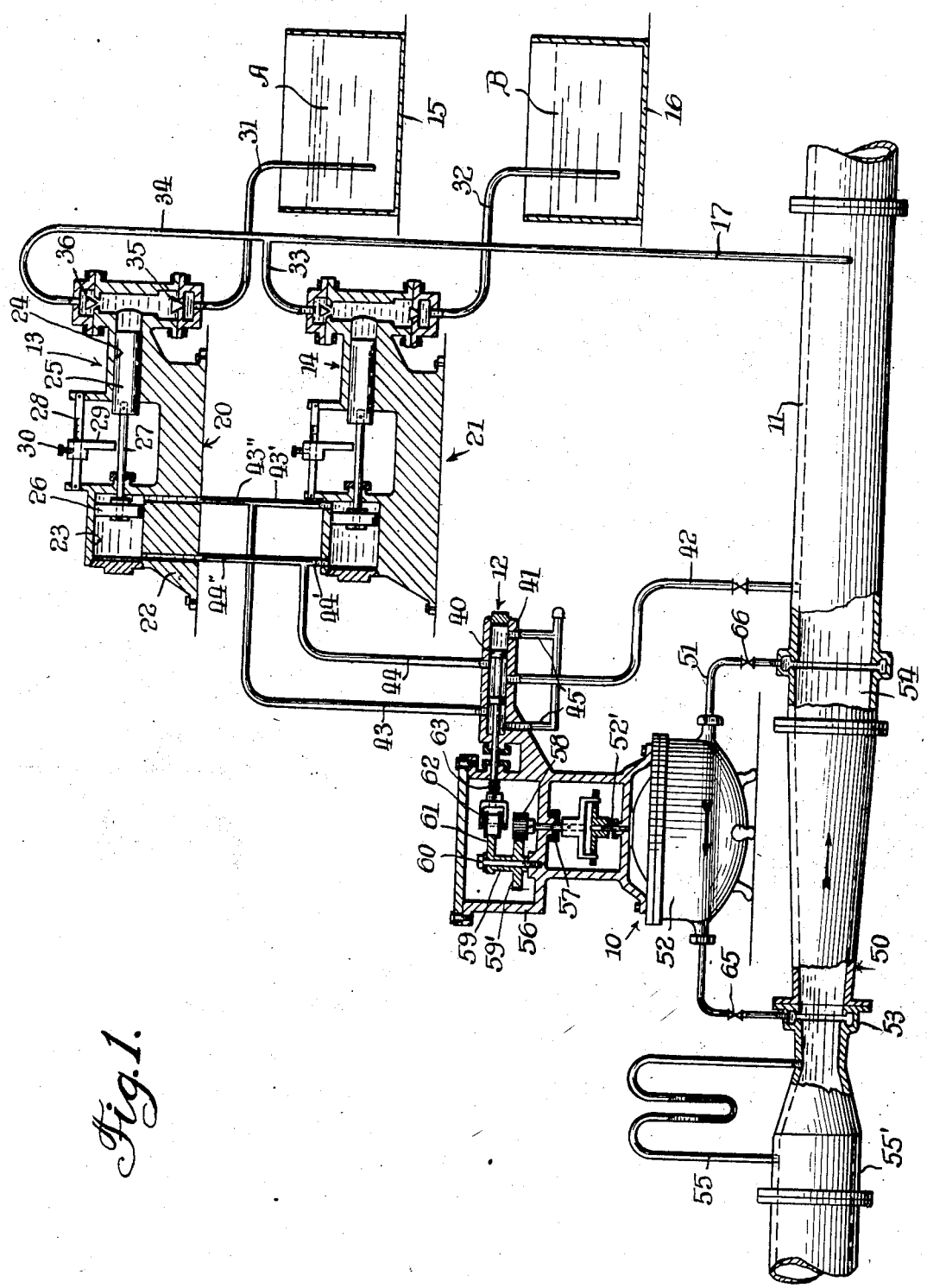
Figure 1 is a view taken partially in section and illustrating diagrammatically an embodiment of the invention wherein a plurality of different reagents are proportioned in accordance with the master flow in the main conduit.

In the embodiment illustrated in Fig. 1 of the drawings, a controller 10 operating in accordance with the variable flow of a master fluid in main conduit 11 serves through periodic actuation of a valve means 12 to govern the stroking of a pair of pressure fluid actuated reagent pumps 13 and 14, whereby actuation of the pumps takes place at a rate which bears a predetermined constant proportion to the variable flow rate of the master fluid.

By means of the two pumps, two different liquid reagents A and B are pumped from individual supply tanks 15 and 16, each reagent being pumped in the desired ratio to the master flow. The present embodiment provides for injection of both reagents into the conduit 11 through a discharge pipe 17 connected to both pumps.

The pumps 13 and 14 are preferably duplicates of each other and are embodied in similar injection units 20 and 21 each of which includes a reciprocating pressure fluid operated actuator for its pump. Each unit comprises a base 22 having alined motor and pump cylinders 23 and 24 located in axially spaced relation thereon. Pump and motor pistons 25 and 26, slidable in their respective cylinders, are connected by a piston rod 27. Across the space between the motor and pump cylinders a scale 28 extends parallel to the piston rod 27, and a stop device 29 mounted on the scale 28 extends downwardly into the path of the outer end of the pump piston so as to limit the outward or suction stroke thereof. The stop device 29 is slidable on the scale 28 and may be secured in any desired position of adjustment by means of a thumb screw 30. Thus adjustability of output is provided for each of the pumps 13 and 14.

An intake pipe 31 extending from the tank 15 to the pump 13 serves to supply reagent A thereto, while a pipe 32 from the tank 16 supplies reagent B to the pump 14. From the discharge sides of the pumps 13 and 14, lines 33 and 34 extend to the common discharge pipe 17, conventional check valves 35 and 36 being provided in the intake and exhaust sides of each of the pumps.

The valve means 12 which is actuated by the controller 10 preferably comprises a single reciprocatory valve member 40 reciprocable in a cylinder 41 and governing the flow of pressure fluid to and from both of the motor cylinders 23. The pressure fluid may, if desired, be taken from the main conduit 11, a valved supply line 42 being provided for this purpose. From the valve cylinder 41 branched conduits 43 and 44 extend, the conduit 43 having branches 43' and 43'' connected to corresponding ends of the two motor cylinders 23, while branches 44' and 44'' of the conduit 44 are connected to the other ends of the two motor cylinders.

Exhaust lines 45 extend from the valve cylinder 41 adjacent the ends thereof, and in the reciprocation of the valve member 40, the pressure and exhaust connections of the two conduits 43 and 44 are alternated to cause simultaneous reciprocation of the two pumps 13 and 14.

The controller 10 of the embodiment of Fig. 1 is preferably of such a construction that it may be applied economically to conduits of relatively large capacity. With this end in view the controller comprises a differential producer 50 mounted in the conduit 10 and acting to produce a proportional but relatively small flow of the master fluid through a metering by-pass 51, this proportional by-pass flow being measured by a conventional meter 52 in the by-pass, and an operating connection being provided between the meter and the valve member 40. In the present instance the differential producer 50 is in the form of a venturi, and the by-pass 51 is connected to the throat 53 and adjacent to the outlet end 54 of the venturi. A manometer 55 may be similarly connected between the inlet end 55' and the throat 53 of the venturi.

Upon the top of the meter 52 a gear box 56 is mounted, and a stub shaft 57 extending downwardly from within the gear box is connected to the upwardly projecting end of the meter shaft 52' for actuation thereby. Within the box 56 a pinion 58 is removably fixed on the shaft 57 in mesh with a gear formed on a cam sleeve 59, which sleeve is rotatably mounted on a vertical stud 60. On the upper end of the cam sleeve 59 an eccentric cam 61 is provided to engage and actuate a cam roller 62 which is carried by the end of the valve member 40. The valve cylinder 41 is, in the present instance, carried by the gear box 56 exteriorly thereof, and the valve member extends through the side of the gear box toward the cam 61. A spring 63 acting between the box and the valve member urges the roller into engagement with the cam.

In the by-pass 51 at opposite sides of the meter 52, valves 65 and 66 are positioned for use in conjunction with the manometer 55 in determining the proportion of the main fluid which is to pass through the meter 52. For any particular adjustment of the valves 65 and 66 the by-pass flow remains substantially proportional to the main flow over a substantial range of variation of the main flow. In most installations this range is sufficient to meet ordinary operating variations, and hence readjustment of the valves 65 and 66 is required only when major and unusual changes in operation occur.

Thus the operator may adjust the valves 65 and 66 until the rate of reciprocation of the valve 40 bears the desired relation to the rate of main flow as indicated by the manometer 55, and this ratio of valve operation to main flow is maintained so long as the main flow rate remains within a reasonable range on either side of the rate at the time of valve adjustment.

The quantities of the reagents A and B injected during each pump stroke may, of course, be varied by adjustment of the stops 29, which adjustment may also be used to vary the proportion of the reagents with respect to each other.

Figure 2:
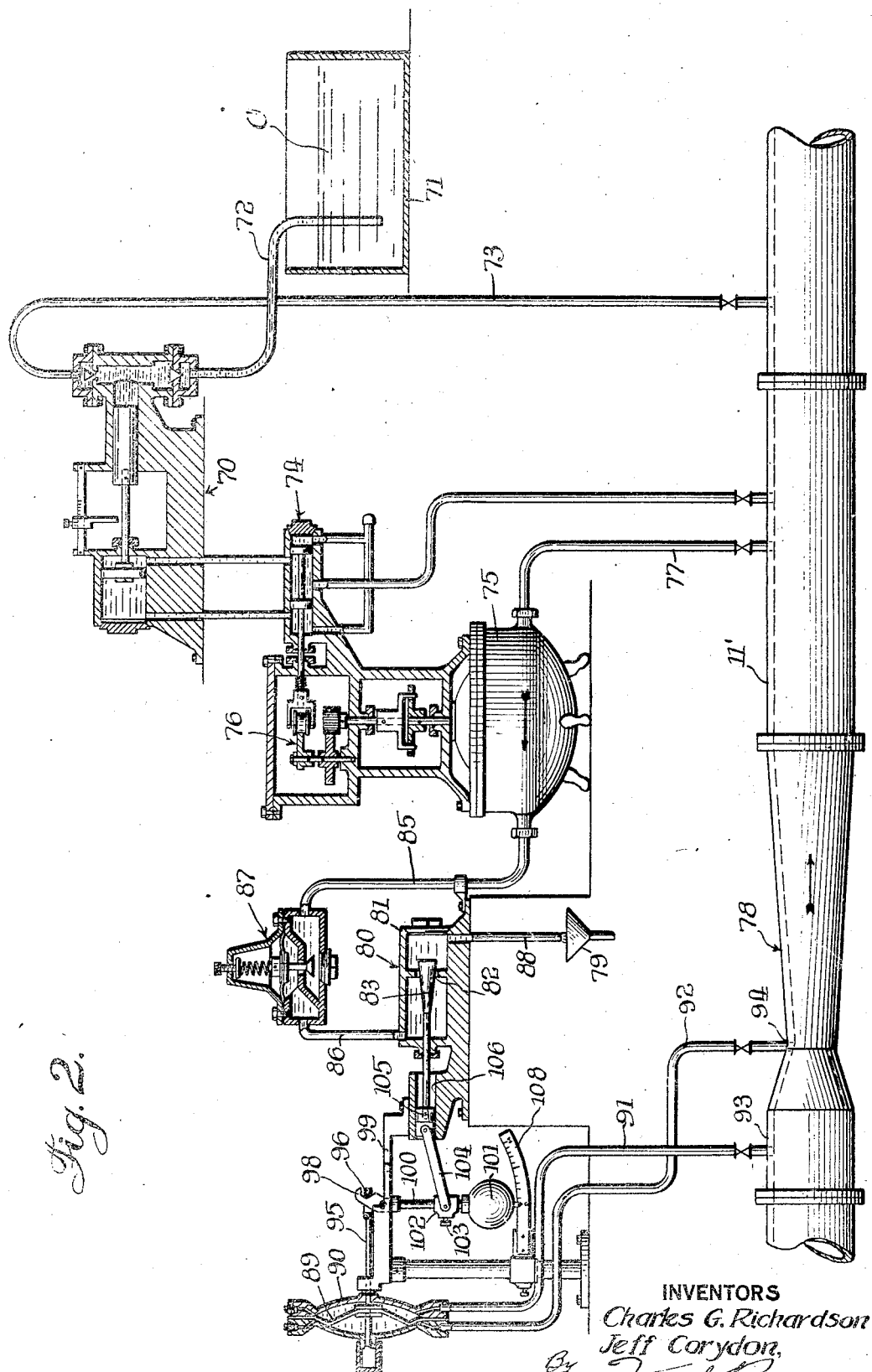
Fig. 2 is a similar view illustrating the proportioning of but a single reagent or substance, the apparatus embodying automatic compensating means whereby major variations in flow rate are rendered immaterial so far as accuracy of proportioning is concerned.

In the embodiment shown in Fig. 2 the invention is so constructed that accuracy of proportioning is maintained over a wide range of variation in the main flow in conduit 11'. This embodiment employs a reagent injection unit 70 which corresponds in form and function with one of the injection units 20 and 21 of Fig. 1 and serves to draw reagent C from tank 71 through a line 72 and to inject the same into conduit 11' through line 73. A valve mechanism 74, an actuating meter 75 and a valve operating cam 76 are provided as in Fig. 1, similar pressure inlet and exhaust connections being employed.

The meter 75, however, has its valved supply pipe 77 connected to the conduit 11' below a venturi 78 in the conduit, and the exhaust from the meter is ultimately passed to a drain 79 rather than returned to the conduit as in Fig. 1.

Such exhaust from the meter 75, is, however, controlled automatically in accordance with the flow rate in the conduit 11' so as to maintain a constant ratio between the main flow and the meter flow even though there is a wide variation in the main flow rate. To this end means is provided for varying the size of effective exhaust outlet in accordance with the main flow rate. This means is associated with the venturi 78 and comprises a variable orifice valve device 80 having a casing 81 providing a valve orifice 82, and a tapered valve member 83 mounted in the casing 81 for longitudinal shifting movement in the orifice to vary the effective area thereof under the control of the venturi 78.

The valve casing 81 is connected to the exhaust side of the meter 75 by pipes 85 and 86 and an intermediate constant pressure valve 87 which maintains a uniform pressure in the valve casing 81 and thereby insures uniform operation of the control valve 80. The exhaust from the valve casing 81 is conducted to the drain 79 by pipe 88.

To actuate the control valve 80 in accordance with the flow rate in the conduit 11', a pressure responsive means such as a diaphragm 89 is employed. This diaphragm is enclosed by a casing 90, and valved pipes 91 and 92 connected to the casing on opposite sides of the diaphragm are connected respectively to the inlet end 93 and throat 94 of the venturi 78. Fixed to the diaphragm 89 is a slide rod 95 which extends from the casing perpendicular to the diaphragm. At its outer end the rod 95 has a pivotal connection 96 with the upper arm 98 of a bell crank, the bell crank being centrally pivoted in a frame 99 and having its other arm 100 normally held in a downwardly projecting position by a weight 101 carried at its lower end. A collar 102 which is adjustable longitudinally along the arm 100, may be fixed in position on the arm 100 by a thumb screw 103 and carries a pivoted connecting link 104 through the medium of which the valve member 83 is actuated. As shown in the drawings the outer end of the valve member 83 carries a head 105 which is slidable in a guideway 106 and is pivotally connected to the other end of the link 104.

Adjacent the lower end of the arm 100 a scale 108 may be mounted to measure the displacement of the arm 100 and thereby indicate the flow rate.

When there is no flow in the conduit 11' the weighted arm 100 assumes its vertical position as in Fig. 2, and the valve member 83 is drawn to the left to produce the smallest effective area in the valve orifice 82. When a flow starts, a differential pressure is created which tends to raise the weighted arm 100 and thereby increase the effective opening of the valve orifice 82. The pressure differential, of course, increases in a predetermined relation to the flow rate in conduit 11' so as to gradually increase the effective area of valve orifice 82 and thereby maintain a by-pass flow through the meter which at all times bears a predetermined ratio to the main flow.

The particular form or taper of the valve member 82 is such as to compensate the angular motion of the levers 98 and 100 in producing the required size of orifice 82 for the various rates of flow in the conduit 11'.

By adjustment of the constant pressure valve 87, the valves in the differential pressure lines 91 and 92, the valve in the meter intake line 77, or the collar 102 on the weighted arm 100, the proportion of flow through the meter 75 may be fixed at any desired value, which value is maintained at all flow rates.

Figure 3:
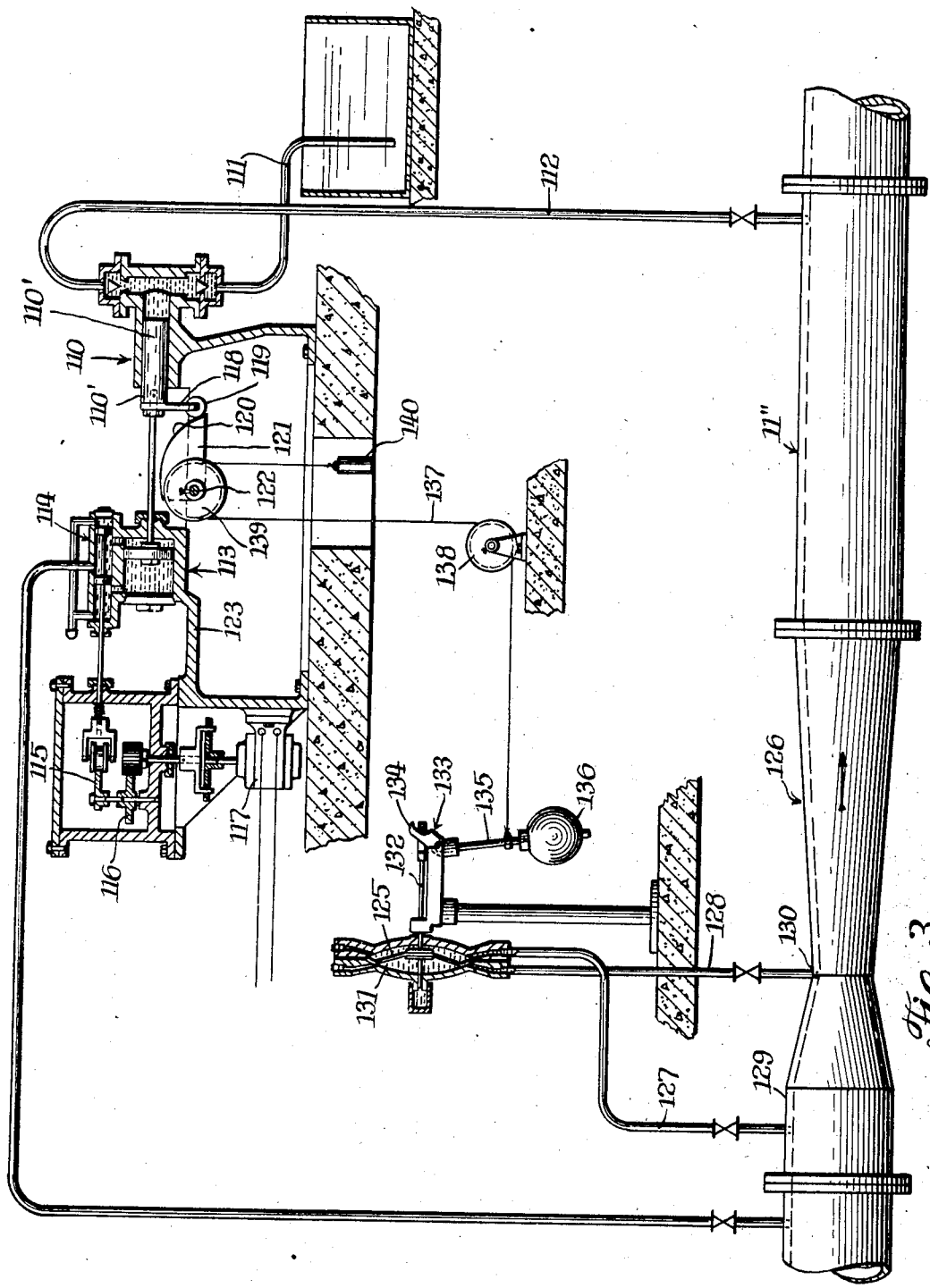
Fig. 3 illustrates another embodiment of the invention wherein accuracy of proportioning is preserved over a wide variation in the rate of flow.

In Fig. 3 of the drawings the invention is embodied in proportioning apparatus wherein an injection pump 110 is reciprocated at a constant rate and a constant proportion of injection is maintained by varying the stroke length of the pump in accordance with flow variations in the main conduit 11''. The pump 110, its intake and injection lines 111 and 112, its pressure fluid pressure motor 113, valve 114 and the associated pressure fluid connection, and valve operating cam 115 and gearing 116 are in all substantial respects similar to the corresponding elements in Figs. 1 and 2, the major differences lying in the means for actuating the valve gearing 116 and for limiting the stroke of the pump piston 110'.

To actuate the valve 114 at a constant rate, a constant speed driver such as an electric motor 117 is operatively connected to the projecting stub shaft of the valve gearing.

As to the stroke limiting means it will be noted that an arm 118 fixed to the outer end of the pump piston 110' projects downwardly so that in the suction stroke of the piston a cam roller 119 carried by the arm 118 will strike an abutment surface 120 formed by a shiftable cam 121. The cam 121 is in the present instance adapted for rotative shifting movement and is therefore mounted on a horizontal shaft 122 journaled in the frame 123 of the injection unit.

Rotation is imparted to the cam shaft 122 automatically in accordance with the flow rate in the main conduit, such action being obtained through the medium of a shiftable diaphragm 125 governed by a differential producer 126 located in the conduit and operatively connected to the cam shaft 122.

The differential producer 126 is preferably in the form of a venturi with valved pressure lines 127 and 128 extending from the inlet end 129 and throat 130 thereof to opposite sides of the diaphragm 125. A stationary casing 131 supports and encloses the diaphragm 125 and it is to this casing that the lines 127 and 128 are connected. Centrally of the diaphragm a slidable control rod 132 is connected, and one end of the rod 132 extends through one side of the casing for operative connection with the cam shaft 122. To effect such connection a bell crank 133, pivotally supported on a horizontal axis, has one arm 134 pivotally connected to the control rod 132, while its other arm 135 normally extends downwardly and is biased to such position by a weight 136 carried thereon. As the pressure differential on the diaphragm increases, the weighted arm 135 is pivoted upwardly in a counter-clockwise direction from its normally vertical position, and such movement is preferably transmitted to the cam shaft 122 by a flexible cord 137 which extends horizontally from the eccentric connection on the arm 135 about a stationary pulley 138, and upwardly over a pulley 139 fixed on the cam shaft 122. A weight 140 on the depending end of the cord beneath the pulley 139 maintains tension on the cord and insures transmission of the motion from the diaphragm to the cam.

The embodiment of Fig. 3, although simple in construction, is particularly adaptable for installations wherein large variations occur in the main flow, it being noted that the cam surface 120 may be formed to compensate not only for variations introduced by the pivotal motion of the lever 135, but also for variations in the ratio between the static pressure differential and the rate of flow.

We claim as our invention:

1. In a proportioning system the combination of a main conduit through which a master fluid may flow under pressure, a relatively small branch line for taking fluid from said conduit, flow responsive means connected to said line and operable to meter the flow of fluid therethrough, a discharge line for said flow responsive means, a variable-orifice control valve in said discharge line, a constant pressure valve in said discharge line between said control valve and said meter, a differential producer in said conduit, a shiftable differential pressure responsive device connected to and controlled by said differential producer, said device being connected to said control valve to vary the effective area of the orifice thereof, and a fluid-feeding means controlled by and operating at a feed rate proportional to the rate of actuation of said flow responsive means.

2. In a proportioning system the combination of a main conduit through which a major fluid may flow under pressure, a meter having its inlet connected to said conduit to receive fluid from said conduit in a relatively small proportion to the quantity of major fluid flow, a substance-feeding means controlled by said meter to feed said substance at a rate varying in direct proportion to the variation in the rate of meter actuation, and means for maintaining a predetermined ratio between the major flow and the flow through said meter comprising an adjustable constant pressure valve in the outlet of said meter, a variable orifice control valve in said outlet beyond said constant pressure valve, a differential producer in said conduit, and pressure responsive means controlled by said differential producer and operable to shift said control valve.

3. A proportioning system comprising in combination, a main conduit through which a major fluid may flow under pressure, a meter having its inlet connected to said conduit to receive fluid from said conduit in a relatively small proportion to the quantity of major fluid flow, a substance-feeding means governed by said meter for feeding such a substance at a rate varying in direct proportion to the variation in the rate of meter actuation, means for adjusting said proportion of the feed rate to the meter rate, and means for maintaining a predetermined ratio between the major flow and the flow through said meter comprising a constant pressure valve in the outlet of said meter, a variable orifice control valve in said outlet beyond said constant pressure valve, a differential producer in said conduit, and pressure responsive means controlled by said differential producer and having an adjustable connection with said control valve through which it is operable to shift said control valve.

4. In a proportioning system the combination of a main conduit through which a main fluid may flow under pressure, a reagent injector discharging into said conduit, means for actuating said injector at a constant rate of speed, a differential producer in said conduit, means connected to said producer and having a part shiftable in response to differential pressure variations in said producer, and means connected to and shiftable with said part operable in such shifting movement to vary the output of said injector in proportion to the flow rate of said main fluid.

5. In a proportioning system the combination of a main conduit through which a main fluid may flow under pressure, a reciprocable reagent pump connected to inject reagent into said conduit, a pressure fluid actuator for reciprocating said pump, a valve for controlling the supply and exhaust of motivating fluid to and from said actuator, means actuating said valve at a constant rate, a differential producer in said conduit, a differential pressure responsive device connected to said producer and having a shiftable element movable in accordance with variations of the pressure differential in said producer, shiftable stop means for limiting the stroke of said pump, and means connecting said shiftable element and said shiftable stop operable to vary said pump stroke in proportion to variations in the flow rate of said main fluid.

6. In a proportioning system the combination of a main conduit through which a main fluid may flow under pressure, a reciprocable reagent pump connected to inject reagent into said conduit, a pressure fluid actuator for reciprocating said pump, a valve for controlling the supply and exhaust of motivating fluid to and from said actuator, means actuating said valve at a constant rate, a differential producer in said conduit, a differential pressure responsive device connected to said producer and having a shiftable element movable in accordance with variations of the pressure differential in said producer, a shiftable cam acting in its shifting movement as a variable stop to limit the stroke of said pump in one direction, and means actuated by said shiftable element to shift said cam and vary the pump stroke in proportion to the main flow rate in said conduit.

7. In a proportioning system a main conduit through which a main fluid may flow under pressure, an injector discharging into said conduit and operated at a constant rate of speed, means for varying the output of said injector while it maintains its constant speed of operation, a flow measuring means connected in said conduit and operatively connected to said output varying means to maintain a constant proportion between said injector output and the flow rate in said main conduit.

8. In a proportioning system the combination of a main conduit, a feeding device for feeding a substance, means actuating said feeding device at a constant rate of speed, means operable to vary the feed-rate of said device while its constant rate of actuation is maintained, means measuring the flow in said conduit and operating said feed-rate varying means to maintain a constant relation between said feed-rate and the flow rate in said main conduit.

9. In a proportioning system the combination of a conduit for conveying a master fluid, means in said conduit for producing a differential pressure corresponding with the rate of said master fluid flow through said conduit, means operable by auxiliary power for injecting a reagent into said conduit, and governing means connected to the points of different pressure of said differential pressure producing means and said reagent injecting means and operable by said pressure difference to control the mean rate of reagent injection in a predetermined proportion to the rate of said master fluid flow through said conduit.

10. The combination of a conduit for conveying a master fluid, a line attached to said conduit, means attached to said conduit and line for producing a flow from said conduit through said line proportional to the main flow in said conduit, flow responsive means in said line having a portion movable corresponding with said flow therethrough, reagent injecting means, and governing means for said injecting means actuatable by said movable part to cause said injecting means to feed reagent into said conduit in a predetermined ratio to the flow of said master fluid through said conduit.

CHARLES G. RICHARDSON.
JEFF CORYDON.